(12) United States Patent
Maeda et al.

(10) Patent No.: US 8,320,471 B2
(45) Date of Patent: Nov. 27, 2012

(54) TRANSMISSION DEVICE FOR DIFFERENTIAL COMMUNICATION

(75) Inventors: Noboru Maeda, Chiryu (JP); Youichirou Suzuki, Nishio (JP); Shigeki Takahashi, Okazaki (JP); Kazuyoshi Nagase, Kitanagoya (JP); Takahisa Koyasu, Chita (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 263 days.

(21) Appl. No.: 12/923,397

(22) Filed: Sep. 20, 2010

(65) Prior Publication Data

US 2011/0135014 A1    Jun. 9, 2011

(30) Foreign Application Priority Data

Dec. 3, 2009    (JP) ................................ 2009-275623

(51) Int. Cl.
*H04B 3/00*    (2006.01)

(52) U.S. Cl. ........ 375/257; 375/258; 375/219; 375/295; 327/106; 327/109; 327/170; 327/172; 327/176; 327/175

(58) Field of Classification Search .................. 375/257, 375/258, 219, 295; 370/86, 30, 115, 82, 370/83, 31, 87, 119, 121; 327/108, 109, 327/170, 172, 176, 175

See application file for complete search history.

(56) References Cited

U.S. PATENT DOCUMENTS 6,087,736 A     7/2000  Ohuchi et al.
2007/0252659 A1  11/2007  Suenaga et al.

FOREIGN PATENT DOCUMENTS

| JP | A-2003-018224 | 1/2003 |
| JP | A-2003-332861 | 11/2003 |

*Primary Examiner* — Zewdu Kassa
(74) *Attorney, Agent, or Firm* — Posz Law Group, PLC

(57) ABSTRACT

In a transmission device for differential communication, a first cathode-side element part is coupled between a first communication line and a cathode-side power supply line, a second cathode-side element part is coupled between a second communication line and the cathode-side power supply line, a first anode-side element part is coupled between the first communication line and an anode-side power supply line, and a second anode-side element part is coupled between the second communication line and the anode-side power supply line. A driving portion drives the element parts based on transmission data input from an outside. A target potential generating portion generates target potentials of the element parts based on potentials of the first communication line and the second communication line.

4 Claims, 5 Drawing Sheets

TRANSMISSION DEVICE FOR DIFFERENTIAL COMMUNICATION

CROSS REFERENCE TO RELATED APPLICATIONS

The present application is based on and claims priority to Japanese Patent Application No. 2009-275623 filed on Dec. 3, 2009, the contents of which are incorporated in their entirety herein by reference.

BACKGROUND OF THE INVENTION

1. Field of the Invention

The present invention relates to a transmission device for differential communication.

2. Description of the Related Art

In a conventional transmission device for differential communication, a power source voltage is applied to a pair of communication lines through a transistor having a small output impedance, a, polarity of the applied voltage is inverted based on a value of transmission data, and thereby the transmission data is transmitted by a differential transmission method.

If a common mode noise having the same phase is superposed to each of the communication lines and potentials of the communication lines increase or decrease, electric current flows in the communication lines so that the potentials are maintained within a range of the power source voltage and a differential output is maintained.

However, the above-described operation cannot deal with a common mode noise that is much larger than the power source voltage. For example, US 2007/0252659 A (corresponding to WO2006/040869) discloses a differential communication system in which a common mode choke coil is provided in series with communication lines and a common mode noise is reduced by the common mode choke coil.

Because the common mode choke coil includes a magnetic substance core and a winding, the common mode choke coil is difficult to be included in an integrated circuit with a transmitting circuit or a receiving circuit. Thus, when a common mode choke coil is used in a differential communication system for restricting a failure due to a common mode noise, there is a difficulty that a substrate area may be increased and a dimension of a transmitting device or a receiving device may be increased and that a cost of a transmitting device or a receiving device may be increased.

SUMMARY OF THE INVENTION

In view of the foregoing problems, it is an object of the present invention to provide a transmission device for differential communication that can transmit transmission data at a predetermined differential voltage without using a common mode choke coil even when a common mode noise exceeding a range of a power source voltage is superposed into communication lines.

A transmission device for differential communication according to an aspect of the present invention includes a first communication line, a second communication line, a cathode-side power supply line, an anode-side power supply line, a first cathode-side element part, a second cathode-side element part, a first anode-side element part, a second anode-side element part, a driving portion, and a target potential generating portion. The cathode-side power supply line is coupled to a cathode side of a direct current power source. The anode-side power supply line is coupled to an anode side of the direct current power source. The first cathode-side element part is coupled between the first communication line and the cathode-side power supply line. The second cathode-side element part is coupled between the second communication line and the cathode-side power supply line. The first anode-side element part is coupled between the first communication line and the anode-side power supply line. The second anode-side element part is coupled between the second communication line and the anode-side power supply line. The driving portion applies a differential voltage between the first communication line and the second communication line by driving one of a group of the first cathode-side element part and the second anode-side element part and a group of the second cathode-side element part and the first anode-side element part based on a value of transmission data input from an outside, and thereby transmitting the transmission data by a differential transmission method. The target potential generating portion generates at least one of a group of a first target potential and a second target potential and a group of a third target potential and a fourth target potential. The first target potential is higher than a potential of the first communication line by a constant voltage. The second target potential is higher than a potential of the second communication line by the constant voltage. The third target potential is lower than the potential of the first communication line by the constant voltage. The fourth target potential is lower than the potential of the second communication line by the constant voltage. When the driving portion drives the first cathode-side element part and the second anode-side element part, the driving portion generates the differential voltage between the first communication line and the second communication line based on the constant voltage by at least one of inputting the second target potential to a control terminal of the first cathode-side element part and inputting the third target potential to a control terminal of the second anode-side element part. When the driving portion drives the second cathode-side element part and the first anode-side element part, the driving portion generates the differential voltage between the first communication line and the second communication line based on the constant voltage by at least one of inputting the first target potential to a control terminal of the second cathode-side element part and inputting the fourth target potential to a control terminal of the first anode-side element part. The differential voltage generated when the driving portion drives the first cathode-side element part and the second anode-side element part and the differential voltage generated when the driving portion drives the second cathode-side element part and the first anode-side element part have different polarities.

In the transmission device, even when a potential of a common mode noise superposed to each of the communication lines is higher than a potential of the cathode-side power supply line or lower than a potential of the anode-side power supply line, a predetermined differential voltage can be generated between the communication lines.

BRIEF DESCRIPTION OF THE DRAWINGS

Additional objects and advantages of the present invention will be more readily apparent from the following detailed description of preferred embodiments when taken together with the accompanying drawings. In the drawings.

DETAILED DESCRIPTION OF THE PREFERRED EMBODIMENTS

First Embodiment

A transmission device for differential communication according to a first embodiment of the present invention will be described with reference to FIG. 1.

The transmission device includes a pair of communication lines L1 and L2 coupled with external communication lines through output terminals To1 and To2, respectively. The transmission device applies a differential voltage, whose polarity changes in accordance with a value of transmission data, between the communication lines L1 and L2, and the transmission data is transmitted through the external communication lines by a differential transmission method. For example, the transmission device can be used in a differential communication system used in a place, such as a vehicle, where there are many noises.

Figure 1:
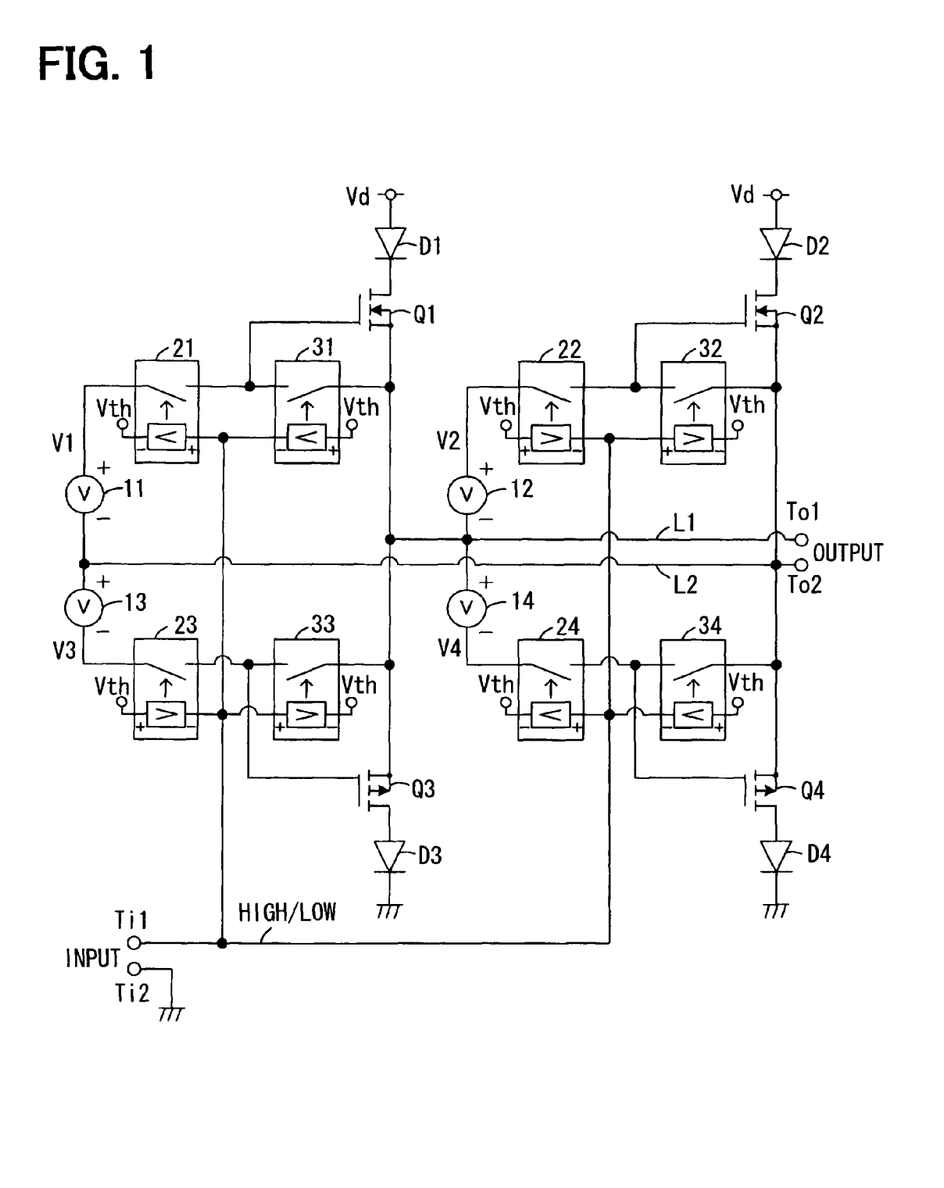
FIG. 1 is a circuit diagram showing a transmission device for differential communication according to a first embodiment of the present invention.

As shown in FIG. 1, the communication line L1 is coupled with a source of a field effect transistor (FET) Q1 whose drain is coupled with a power source line through a diode D1. The communication line L2 is coupled with a source of a FET Q2 whose drain is coupled with the power source line through a diode D2. The communication line L1 is also coupled with a source of a FET Q3 whose drain is coupled with a ground line through a diode D3. The communication line L2 is also coupled with a source of a FET Q4 whose drain is coupled with the ground line through a diode D4.

The power source line is a cathode-side power supply line coupled with a cathode side of a direct-current power source. Anodes of the diodes D1 and D2 are coupled with the power source line and cathodes of the diodes D1 and D2 are coupled with the drains of the FETs Q1 and Q2, respectively. Each of the FETs Q1 and Q2 is formed of an N channel MOSFET. By coupling the sources of the FETs Q1 and Q2 with the communication line L1 and L2, respectively, source follower circuits are formed.

Thus, when the FETs Q1 and Q2 are activated, potentials of the communication lines L1 and L2 are maintained at values lower than gate voltages of the FETs Q1 and Q2 by threshold voltages of the FETs Q1 and Q2, respectively.

The ground line is an anode-side power supply line coupled with an anode side of the direct-current power source. Cathodes of the diodes D3 and D4 are coupled with the ground line, and anodes of the FETs Q3 and Q4 are coupled with the drains of the FETs Q3 and Q4. Each of the FETs Q3 and Q4 is formed of a P channel MOSFET. By coupling the sources of the FETs Q3 and Q4 with the communication line L1 and L2, respectively, source follower circuits are formed.

Thus, when the FETs Q3 and Q4 are activated, the potentials of the communication lines L1 and L2 are maintained at values higher than gate voltages of the FETs Q3 and Q4 by threshold voltages of the FETs Q3 and Q4, respectively.

The transmission device further includes voltage sources 11-14. The voltage source 11 generates a target potential V1 that is higher than the potential of the communication line L2 by a constant voltage Vc. The voltage source 12 generates a target potential V2 that is higher than the potential of the communication line L1 by the constant voltage Vc. The voltage source 13 generates a target potential V3 that is lower than the potential of the communication line L2 by the constant voltage Vc. The voltage source 14 generates a target potential V4 that is lower than the potential of the communication line L1 by the constant voltage Vc.

Gates of the FETs Q1 and Q4 are coupled with driving switches 21 and 24, respectively. When the value of the transmission data input through input terminals Ti1 and Ti2 is 1, that is, when an input signal level is a high level, the driving switches 21 and 24 are turned on and input the target potentials V1 and V4 to the gates of the FETs Q1 and Q4 so as to activate the FETs Q1 and Q4. The gates of the FETs Q1 and Q4 are also coupled with driving stop switches 31 and 34, respectively. When the value of the transmission data is 0, that is, when the input signal level is a low level, the driving stop switches 31 and 34 are turned on and couple the gates and the sources of the FETs Q1 and Q4 so as to deactivate the FETs Q1 and Q4.

Gates of the FETs Q2 and Q3 are coupled with driving switches 22 and 23, respectively. When the value of the transmission data is 0, that is, when the input signal level is the low level, the driving switches 22 and 23 are turned on and input the target potentials V2 and V3 to the gates of the FETs Q2 and Q3 so as to activate the FETs Q2 and Q3. The gates of the FETs Q2 and Q3 are also coupled with driving stop switches 32 and 33, respectively. When the value of the transmission data is 1, that is, when the input signal level is the high level, the driving stop switches 32 and 33 are turned on and couple the gates and the sources of the FETs Q2 and Q3 so as to deactivate the FETs Q2 and Q3.

Each of the driving switches 21-24 and the driving stop switches 31-34 determines whether the value of the transmission data is 1 (high level) or 0 (low level) by comparing the signal level of the transmission data input through the input terminals Ti1 and Ti2 with a determination voltage Vth.

Specifically, each of the driving switches 21-14 and the driving stop switches 31-34 determines the value of the transmission data based on a determination result of whether the signal level is higher than the determination voltage Vth.

Thus, the determination voltage Vth is a voltage between the signal level (high level) at a time when the value of the transmission data is 1 and the signal level (low level) at a time when the value of the transmission data is 0.

In the transmission device, when the value of the transmission data 1, the FETs Q1 and Q4 are activate and the FETs Q2 and Q3 are deactivated. In contrast, when the value of transmission data is 0, the FETs Q2 and Q3 are, activated and the FETs Q1 and Q4 are deactivated.

Thus, when the transmission data is 1, that is, when the FETs Q1 and Q4 are activated, the potential of the communication line L1 is the difference when the threshold voltage of the FET Q1 is subtracted from the target potential V1, and the potential of the communication line L2 is the sum of the target potential V4 and the threshold voltage of the FET Q4, and the potential difference between the communication lines L1 and L2 is a constant voltage (+Vc−the threshold voltage).

When the transmission data is 0, that is, when the FETs Q2 and Q3 are activated, the potential of the communication line L1 is the sum of the target potential V3 and the threshold voltage of the FET Q3, and the potential of the communication line L2 is the difference when the threshold voltage of the FET Q2 is subtracted from the target potential V2, and the potential difference between the communication lines L1 and L2 is a constant voltage (−Vc+the threshold voltage).

Even when a common mode noise higher than a power source potential is superposed to the external communication line coupled with the output terminals To1 and To2 and the potentials of the communication lines L1 and L2 increase or even when a common mode noise lower than a ground line potential is superposed to the external communication line coupled with the output terminals To1 and To2 and the potentials of the communication lines L1 and L2 decrease, the potential difference between the communication lines L1 and L2 is maintained at the constant voltage (+Vc−the threshold voltage or −Vc+the threshold voltage) based on the value of the transmission data.

The transmission device according to the present embodiment can transmit the transmission data at a substantially constant voltage without providing a common mode choke coil in the external communication line coupled with the output terminals To1 and To2 and can secure a transmission performance of the transmission data.

In addition, because it is not necessary to provide a common mode choke coil to the external communication line, a dimension of the differential communication system can be reduced and a cost of the differential communication system can be reduced. In the transmission device shown in FIG. 1, the FET Q1 and the diode D1 can function as a first cathode-side element part, and the FET Q2 and the diode D2 can function as a second cathode-side element part. The FET Q3 and the diode D3 can function as a first anode-side element part, and the FET Q4 and the diode D4 can function as a second anode-side element part. The driving switches 21-24 and the driving stop switches 31-34 can function as a driving portion. The voltage sources 11-14 can function as a target potential generating portion. The target potential V1 can function as a second target potential. The target potential V2 can function as a first target potential. The target potential V3 can function as a fourth target potential. The target potential V4 can function as a third target potential.

The voltage sources 11-14 shown in FIG. 1 can be provided by an external power source. However, in order to correspond to a case where a common mode noise higher than the power source voltage Vd is superposed to the communication lines L1 and L2, the power source voltage of the external power source needs to be set to a high voltage. Thus, the voltage sources 11-14 may be formed of a current mirror circuit.

Each of the driving switches 21-24 and the driving stop switches 31-34 may be any switch circuit that can change an on-off state based on the data of the transmission data. For example, each of the driving switches 21-24 and the driving stop switches 31-34 can be simply formed of a switching element such as a FET and a bipolar transistor.

As an example of a configuration of the transmission device according to the present embodiment, a case where the source voltages 11-14 are formed of a current mirror circuit and each of the driving switches 21-24 and the driving stop switches 31-34 is formed of a FET will be described with reference to FIG. 2.

When the voltage sources 11-14 are formed of a current mirror circuit, two constant current circuits that output a constant current using the power source voltage Vd are formed. One of the constant current circuits is formed of a P channel MOSFET Q41. A source of the P channel MOSFET Q41 is coupled with the power source line. A drain of the P channel MOSFET Q41 is coupled with the ground line through a resistor R41. A gate and the drain of the P channel MOSFET Q41 are directly coupled with each other.

The other one of the constant current circuits is formed of an N channel MOSFET Q51. A source of the N channel MOSFET Q51 is coupled with the ground line. A drain of the N channel MOSFET Q51 is coupled with the power source line through a resistor R51. A gate and the drain of the N channel MOSFET Q41 are directly coupled with each other.

The FET Q41 is coupled with the FETs Q42 and Q43 whose gates are coupled with each other so as to form a current mirror circuit. The FET Q51 is coupled with the FETs Q52 and Q53 whose gates are coupled with each other so as to form a current mirror circuit. Between the FETs Q42 and Q52, diodes D11 and D13 are coupled so that the constant current flows from the FET Q42 to FET Q52. Between the FETs Q43 and Q53, diodes D12 and D14 are coupled so that the constant current flows from the FET Q43 to the FET Q53.

Between the diodes D11 and D13, resistors R11 and R13 are coupled. Between the diodes D12 and D14, resistors R12 and R14 are coupled. The resistors R11-R14 have the same resistance. The communication line L2 is coupled to a junction point of the resistors R11 and R13. The communication line L1 is coupled to a junction point of the resistors R12 and R14.

The constant current flows to each of the resistors R11-R14, and the target potentials V1-V4 are generated on opposite side of the resistors R11-R14 from the communication line L1 or L2. The target potentials V1-V4 are higher or lower than the potential of the communication line L1 or L2 by the constant voltage Vc. The constant voltage Vc=the resistance of each of the resistors R11-R14×the constant current value.

In a case where a common mode noise higher than the power source potential is superposed to each of the communication lines L1 and L2, the diodes D1 and D2 receive reverse biases. Thus, an electric current that flows from the communication lines L1 and L2 to the power source through the FETs Q1 and Q2 is not generated, and the target potentials V3 and V4 lower than the potentials of the communication lines L1 and L2 by the constant voltage Vc are generated. When the value of the transmission data is 1, that is, when the FETs Q1 and Q4 are activated, the potential of the communication line L1 remains the potential of the common mode noise, and the potential of the communication line L2 becomes the sum of the target potential V4 and the threshold voltage of the FET Q4. Thus, the potential difference between the communication lines L1 and L2 is controlled to be the constant voltage (+Vc−the threshold voltage).

When the value of the transmission data is 0, that is, when the FETs Q2 and Q3 are activated, the potential of the communication line L1 is the sum of the target potential V3 and the threshold voltage of the FET Q3 and the potential of the communication line L2 remains the potential of the common mode noise. Thus, the potential difference between the communication lines L1 and L2 is controlled to be the constant voltage (−Vc+the threshold voltage).

In a case where a common mode noise lower than the potential of the ground line is superposed to each of the communication lines L1 and L2, the diodes D3 and D4 receive reverse biases. Thus, an electric current that flows from the ground line to the communication line through the FETs Q3 and Q4 is not generated, and the target potentials V1 and V2 higher than the potentials of the communication lines L1 and L2 by the constant voltage Vc are generated. When the value of the transmission data is 1, that is, when the FETs Q1 and Q4 are activated, the potential of the communication line L1 is the difference when the threshold voltage of the FET Q1 is subtracted from the target potential V1, and the potential of the communication line L2 remains the potential of the common mode noise. Thus, the potential difference between the communication lines L1 and L2 is controlled to be the constant voltage (+Vc−the threshold voltage).

When the transmission data is 0, that is, when the FETs Q2 and Q3 are activated, the potential of the communication line L1 remains the potential of the common mode noise, and the potential of the communication line L2 is the difference when the threshold voltage of the FET Q2 is subtracted from the target potential V2, and the potential difference between the communication lines L1 and L2 is controlled to be the constant voltage (−Vc+the threshold voltage).

As described above, when the voltage sources 11-14 that can function as the target potential generating portion is configured by the current mirror circuit, the target potentials V1-V4 higher or lower than the potential of the communication line L1 or L2 by the constant voltage Vc are generated by supplying the constant current to the resistors R11-R14. Thus, it is not necessary to provide an external power source that can generate a high voltage in order to generate the target potentials V1-V4. Even when a common mode noise higher than the power source potential is superposed to the external communication line coupled with the output terminals To1 and To2 and the potentials of the communication lines L1 and L2 increase or even when a common mode noise lower than the ground line potential is superposed to the external communication line coupled with the output terminals To1 and To2 and the potentials of the communication lines L1 and L2 decrease, the potential difference between the communication lines L1 and L2 is maintained at the constant voltage (+Vc−the threshold voltage or −Vc+the threshold voltage) based on the value of the transmission data.

Figure 2:
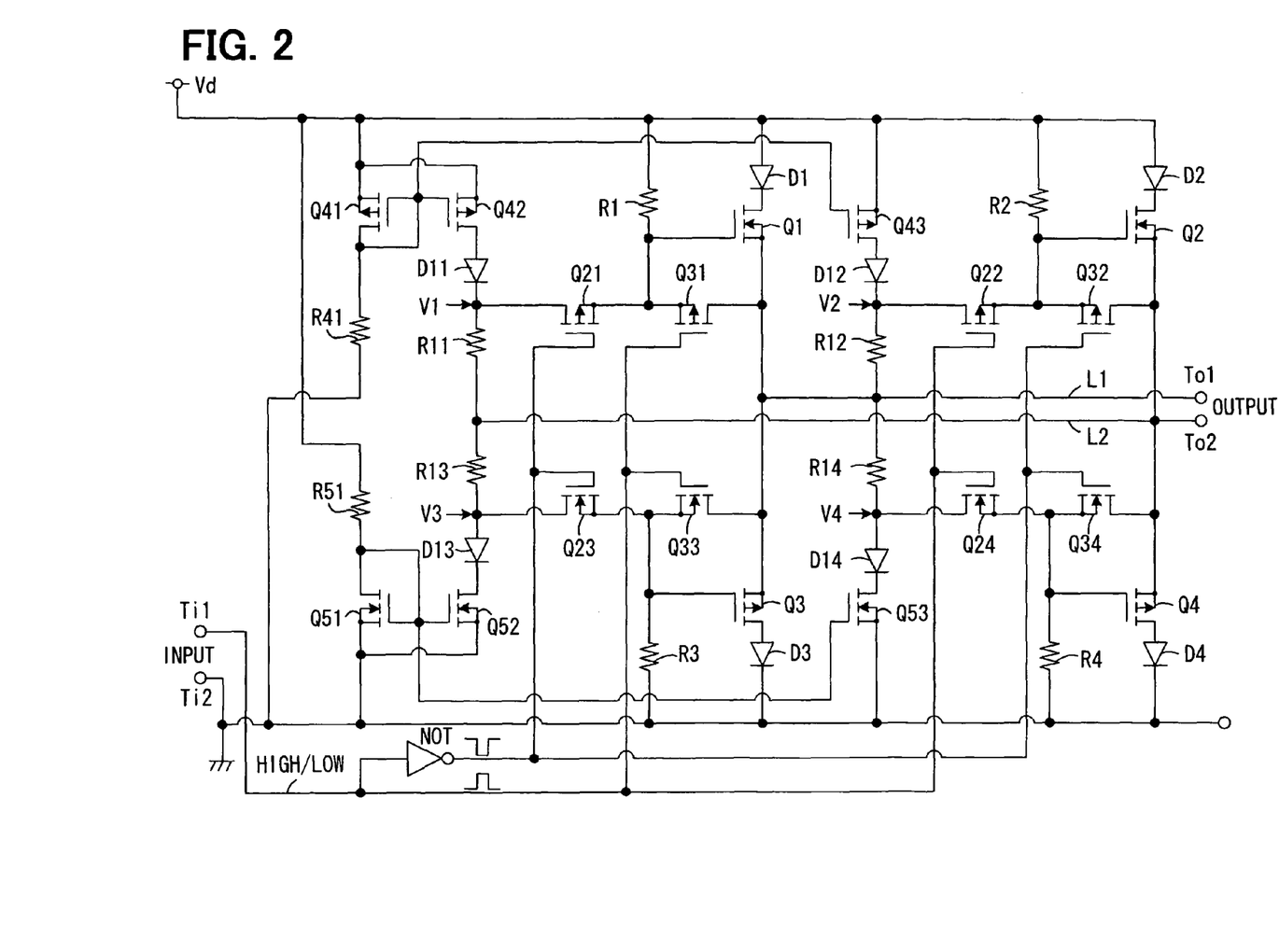
FIG. 2 is a circuit diagram showing an exemplary configuration of the transmission device according to the first embodiment.

When each of the driving switches 21-24 and the driving stop switches 31-34 is configured by a FET, as shown in FIG. 2, an inverting line is provided in addition to a signal line. In the signal line, an input signal (transmission data) input through the input terminals Ti1 and Ti2 flows as it is. In the inverting line, the signal level of the input signal, that is, a logic of the transmission data is inverted by an inverting circuit (NOT) and the inverted input signal flows.

The driving switches 21, 22 and the driving stop switches 31, 32 are formed of P channel MOSFETs Q21, Q22, Q31, and Q32, respectively. Sources of the FETs Q21 and Q31 are coupled with the gate of the FET Q1 and are coupled with the power source line through a resistor R1. Sources of the FETs Q22 and Q32 are coupled with the gate of the FET Q2 and are coupled with the power source line through a resistor R2.

The driving switches 23, 24 and the driving stop switches 33, 32 are formed of N channel MOSFETs Q23, Q24, Q33, and Q34, respectively. Sources of the FETs Q23 and Q33 are coupled with the gate of the FET Q3 and are coupled with the ground line through a resistor R3. Sources of the FETs Q24 and Q34 are coupled with the gate of the FET Q4 and are coupled with the ground line through a resistor R4.

Drains of the FETs Q21-Q24 are respectively coupled with ends of the resistors R11-R14 where the target potentials V1-V4 are generated. Drains of the FETs Q31-Q34 are respectively coupled with the sources of the FETs Q1-Q4.

Gates of the FETs Q21, Q23, Q32, and Q34 are coupled with the inverting line in which the inverted input signal (transmission data) flows. Gates of the FETs Q31, Q32, Q22, and Q24 are coupled with the signal line in which the input signal flows as it is.

In the transmission device in FIG. 2, when the value of the transmission data is 1, the FETs Q21, Q24, Q32, Q33 are activated, the target potentials V1 and V4 are respectively input to the gates of the FETs Q1 and Q4, the FETs Q1 and Q4 are activated, and the FETs Q2 and Q3 are deactivated. When the value of the transmission data is 0, the FETs Q22, Q23, Q31, and Q34 are activated, the target potentials V2 and V3 are respectively input to the gates of the FETs Q2 and Q3, the FETs Q2 and Q3 are activated, and the FETs Q1 ad Q4 are deactivated.

Thus, even when the transmission device shown in FIG. 1 is formed using the current circuit and the FETs Q21-Q24 and Q31-Q34 as shown in FIG. 2, the transmission device can operate as described above and can have above-described effects.

Next, differential voltages obtained at a transmitting end and a receiving end are simulated in a case where a common node noise higher than the power source voltage Vd is superposed to a transmission channel (external communication line) when the transmission data is transmitted by a differential transmission method using the transmission device according to the present embodiment.

Figure 4:
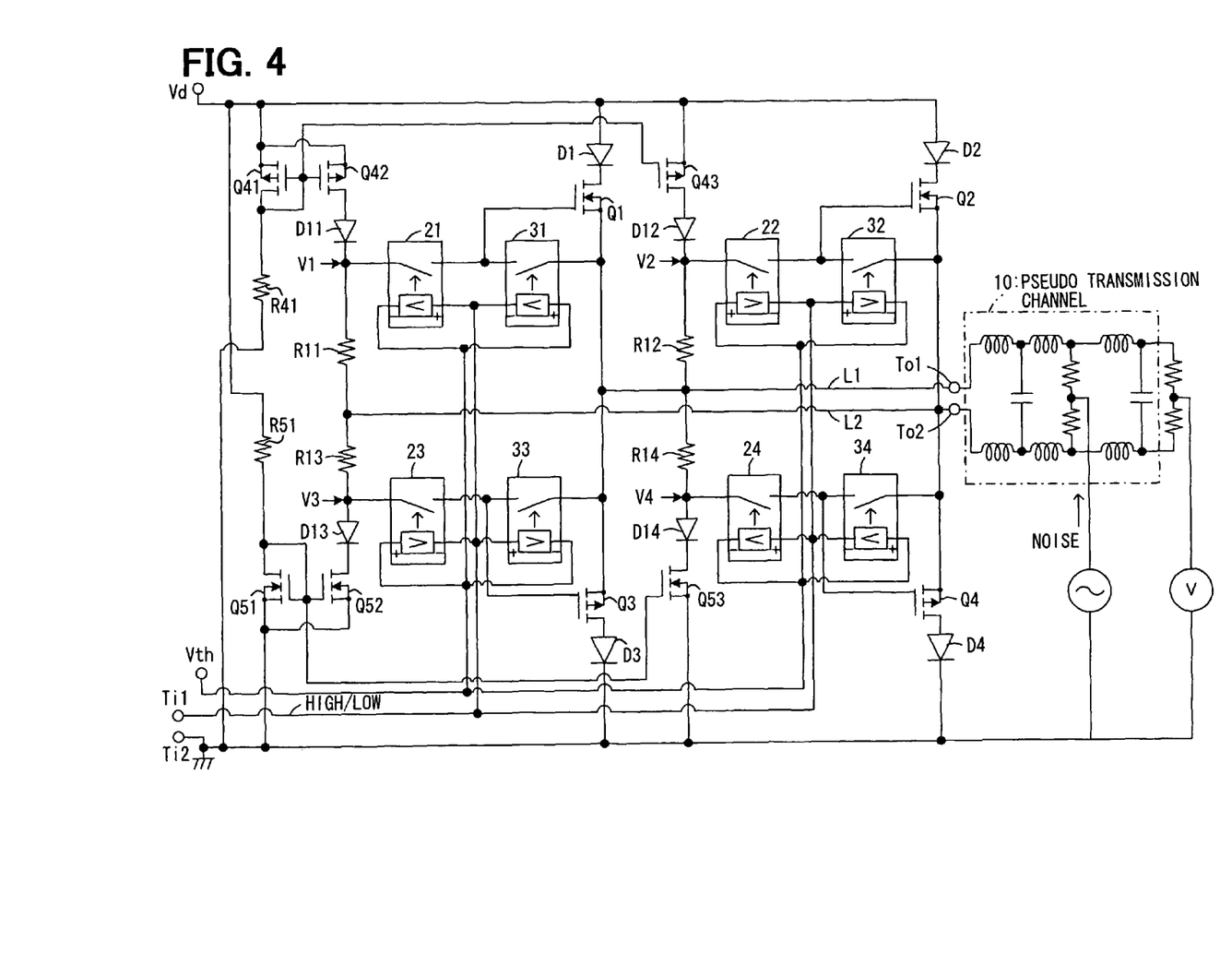
FIG. 4 is a diagram showing a differential communication system used for simulating the differential voltages shown in FIG. 3.

In the simulation, as shown in FIG. 4, a pseudo transmission channel including coils and capacitors is coupled with the output terminals To1 and To2 of the transmission device according to the present embodiment. The transmission data is inverted at predetermined intervals and the transmission data is transmitted from the transmission device. In addition, a common mode noise is applied to the pseudo transmission channel 10.

Figure 3:
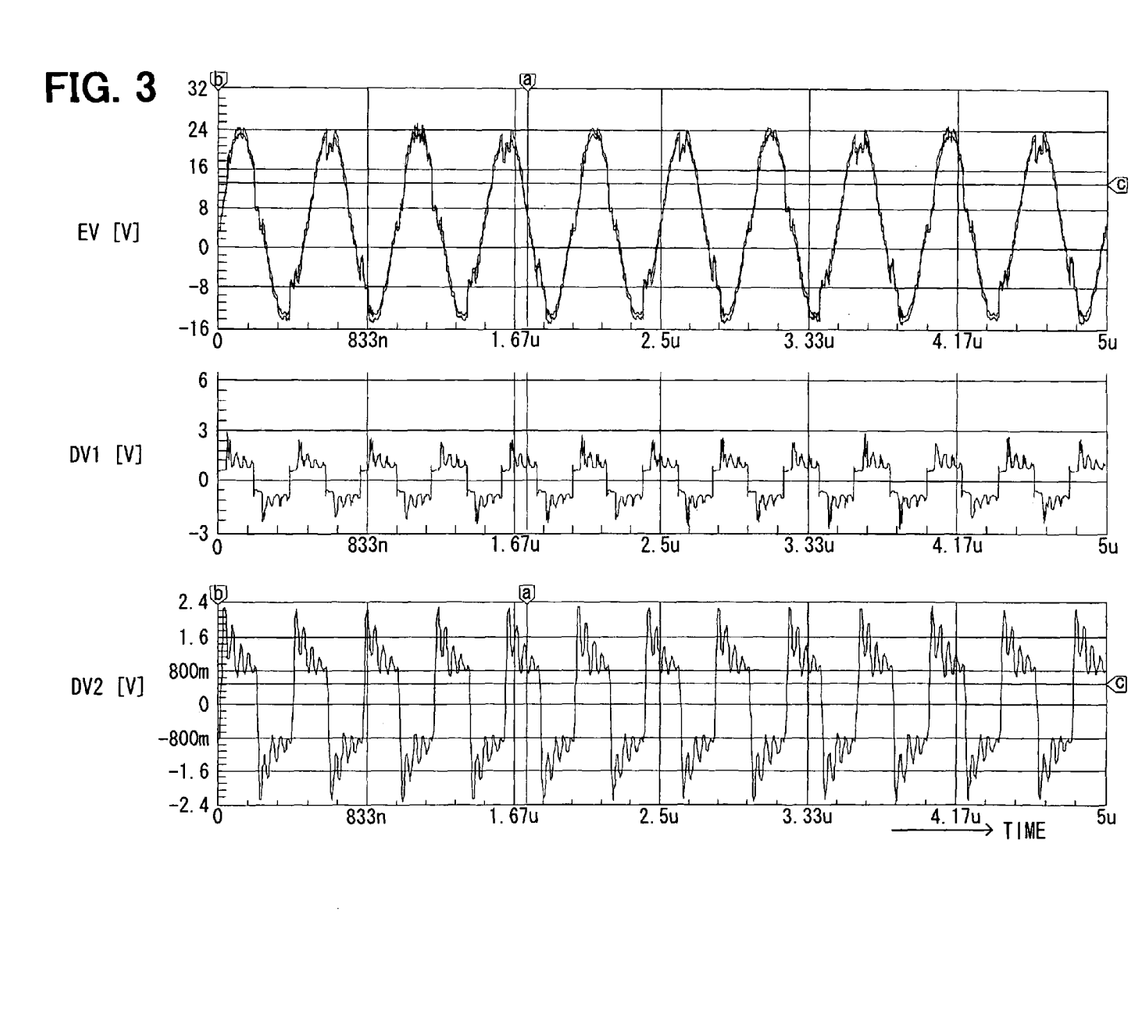
FIG. 3 is a timing diagram showing a simulation result of differential voltages at a time when a common mode noise occurs.

In the simulation, voltages EV of the respective output terminals To1 and To2, a differential voltage DV1 between the output terminals To1 and To2, and a differential voltage DV2 at an end of the pseudo transmission channel 10 are obtained as shown in FIG. 3. The power source voltage Vd is 5V.

As shown in FIG. 3, the voltages EV of the respective output terminals To1 and To2 change in the same phase due to the common mode noise applied to the pseudo transmission channel 10. However, the differential voltage DV1 between the output terminals To1 and To2 changes based on the value of the transmission data without being influenced by the change in the voltages EV. The differential voltage DV2 at the end of the pseud transmission channel 10 changes in response to the differentia voltage DV1 without being influenced by the common mode noise.

The simulation result confirms that the transmission device according to the present embodiment can normally transmit the transmission data by the differential transmission method even when the common mode noise higher than the power source voltage Vd is superposed to the communication lines.

The transmission device shown in FIG. 4 shows the transmission device in FIG. 1 in which the voltage sources 11-14 are formed of a current mirror circuit. That is, a configuration of the transmission device shown in FIG. 4 is a combination of the transmission devices shown in FIG. 1 and FIG. 2. Therefore, a detail description of the transmission device shown in FIG. 4 is omitted.

Second Embodiment

Figure 5:
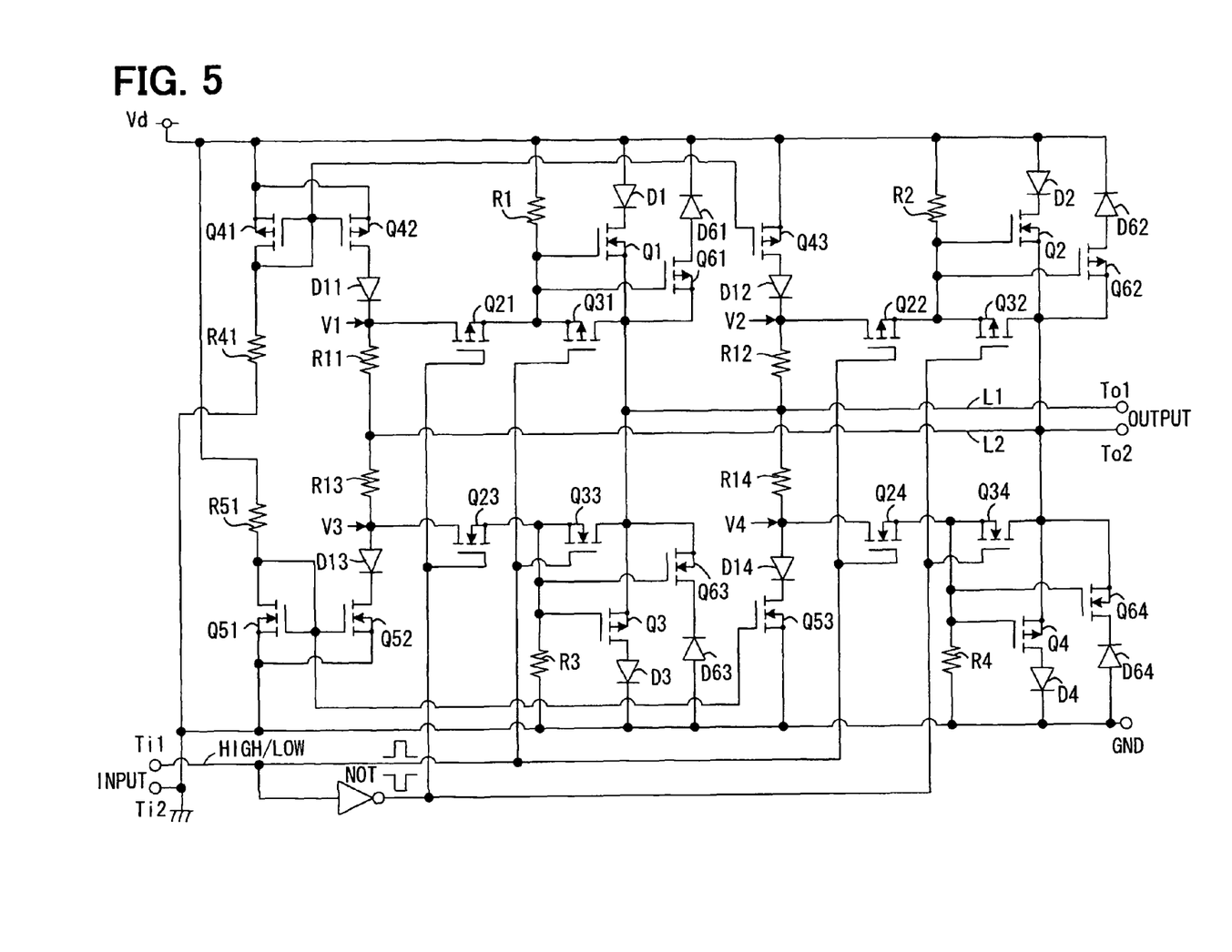
FIG. 5 is a diagram showing a transmission device for differential communication according to a second embodiment of the present invention.

A transmission device according to a second embodiment of the present invention will be described with reference to FIG. 5.

In the transmission device according to the present embodiment, FETs Q61-Q64 are respectively coupled in parallel with the FETs Q1-Q4 that can function as the first cathode-side element part, the second cathode-side element part, the first anode-side element part, and the second anode-side element part. When a common mode noise of a positive polarity or negative polarity exceeding the power source voltage Vd is superposed to the communication lines L1 and L2, electric current flows between the communication lines and the power source line or between the ground line and the communication lines through diodes D61-D64 so that the potentials of the communication lines do not exceed the range of the power source voltage Vd. The other parts of the transmission device according to the present embodiment are similar to those of the transmission device shown in FIG. 2.

Each of the FETs Q61 and Q62 are formed of a P channel MOSFET. A source and a gate of the FET Q61 are respectively coupled with the source and the gate of the FET Q1, and a drain of the FET Q61 is coupled with the power source line through the diode D61. A source and a gate of the FET Q62 are respectively coupled with the source and the gate of the FET Q2, and a drain of the FET Q62 is coupled with the power source line through the diode D62. An anode of the diode D61 is coupled with the drain of the FET Q61 and a cathode of the diode D61 is coupled with the power source line. An anode of the diode D62 is coupled with the drain of the FET Q62 and a cathode of the diode D62 is coupled with the power source line.

Each of the FETs Q63 and Q64 are formed of an N channel MOSFET. A source and a gate of the FET Q63 are respectively coupled with the source and the gate of the FET Q3, and a drain of the FET Q63 is coupled with the ground line through the diode D63. A source and a gate of the FET Q64 are respectively coupled with the source and the gate of the FET Q4, and a drain of the FET Q64 is coupled with the ground line through the diode D64. A cathode of the diode D63 is coupled with the drain of the FET Q63 and an anode of the diode D63 is coupled with the ground line. A cathode of the diode D64 is coupled with the drain of the FET Q64 and a cathode of the diode D64 is coupled with the ground line.

When a common mode noise higher than the potential of the power source line is superposed to the communication lines L1 and L2 and when the FETs Q1 and Q2 are activated, gate potentials of the FETs Q61 and Q62 are drawn to the power source potential side by the resistors R1 and R2, and the gate potentials of the FETs Q61 and Q62 become lower than source potentials of the FETs Q61 and Q62. Then, the FETs Q61 and Q62 are activated, electric current flows from the communication lines L1 and L2 to the power source line through the diodes D61 and D62, and thereby the potentials of the communication lines L1 and L2 are respectively controlled to be lower than or equal to upper limit potentials that are lower than the potential of the power source line by forward voltages of the diodes D61 ad D62. When the FETs Q1 and Q2 are deactivated, that is, when the FETs Q31 and Q32 are activated, the gate potential and the source potential of each of the FETs Q61 and Q62 are the same potential. Thus, the FETs Q61 and Q62 are deactivated.

When a common mode noise of negative polarity lower than the potential of the power source line is superposed to the communication lines L1 and L2 and when the FETs Q3 and Q4 are activated, gate potentials of the FETs Q63 and Q64 are drawn to the ground line potential side by the resistors R3 and R4, and the gate potentials of the FETs Q63 and Q64 become higher than source potentials of the FETs Q63 and Q64. Then, the FETs Q63 and Q64 are activated, electric current flows from the ground line to the communication lines L1 and L2 through the diodes D61 and D62, and thereby the potentials of the communication lines L1 and L2 are respectively controlled to be higher than or equal to lower limit potentials that are higher than the potential of the power source line by forward voltages of the diodes D63 ad D64. When the FETs Q3 and Q4 are deactivated, that is, when the FETs Q33 and Q34 are activated, the gate potential and the source potential of each of the FETs Q63 and Q64 are the same potential. Thus, the FETs Q63 and Q64 are deactivated.

The transmission device according to the present embodiment can control the differential voltage between the communication lines L1 and L2 to be a constant voltage based on the value of the transmission data. Furthermore, the transmission device according to the present embodiment can restrict the potential of each of the communication lines L1 and L2 from being largely away from the range of the power source voltage Vd due to a common mode noise. Thus, a receiving end can receive the transmission data with certainty.

The FET Q61 and the diode D61 can function as a first upper-limit control portion. The FET Q62 and the diode D62 can function as a second upper-limit control portion. The FET Q63 and the diode D63 can function as a first lower-limit control portion. The FET Q64 and the diode D64 can function as a second lower-limit control portion.

Other Embodiments

Although the present invention has been fully described in connection with the preferred embodiments thereof with reference to the accompanying drawings, it is to be noted that various changes and modifications will become apparent to those skilled in the art.

In each of the above-described embodiments, each of the first cathode-side element part, the second cathode-side element part, the first anode-side element part, and the second anode-side element part is formed of a source follower circuit including an N channel MOSFET or a P channel MOSFET. Each of the element parts may also be formed of an emitter follower circuit that includes an NPN bipolar transistor or a PNP bipolar transistor whose emitter is coupled with corresponding one of the communication lines L1 and L2.

In each of the above-described embodiments, the target potentials V2 and V1 higher than the potentials of the communication lines L1 and L2 by the constant voltage Vc and the target potentials V4 and V3 lower than the potentials of the communication lines L1 and L2 by the constant voltage Vc are generated with reference to the potentials of the communication lines L1 and L2. Then, based on the value of the transmission data, the target potentials V1 and V4 are applied to the gates of the FETs Q1 and Q4 or the target potentials V2 and V3 are applied to the gates of the FETs Q2 and Q3, and thereby a predetermined differential voltage based on the constant voltage Vc is generated between the communication lines L1 and L2. Alternatively, the target potentials V1 and V2 or the target potentials V3 and V4 may be generated, and the generated target potentials V1 and V2 or V3 and V4 may be applied to corresponding gates of the FETs Q1 and Q2 or the FETs Q3 and Q4 so that a differential voltage is generated between the communication lines L1 and L2.

In this case, even when a common mode noise lower than the ground potential is superposed to the communication lines L1 and L2 or even when a common mode noise higher than the potential of the cathode-side power source line is superposed to the communication line L1 and L2, the differential communication can be normally performed. Therefore, the transmission device may be used under a condition where a potential of a common mode noise superposed to the communication lines L1 and L2 is one of positive and negative.

What is claimed is:
1. A transmission device for differential communication, comprising:
 a first communication line and a second communication line;
 a cathode-side power supply line coupled to a cathode side of a direct current power source;

an anode-side power supply line coupled to an anode side of the direct current power source;

a first cathode-side element part coupled between the first communication line and the cathode-side power supply line;

a second cathode-side element part coupled between the second communication line and the cathode-side power supply line;

a first anode-side element part coupled between the first communication line and the anode-side power supply line;

a second anode-side element part coupled between the second communication line and the anode-side power supply line;

a driving portion applying a differential voltage between the first communication line and the second communication line by driving one of a group of the first cathode-side element part and the second anode-side element part and a group of the second cathode-side element part and the first anode-side element part based on a value of transmission data input from an outside, and thereby transmitting the transmission data by a differential transmission method; and a target potential generating portion generating at least one of a group of a first target potential and a second target potential and a group of a third target potential and a fourth target potential, the first target potential being higher than a potential of the first communication line by a constant voltage, the second target potential being higher than a potential of the second communication line by the constant voltage, the third target potential being lower than the potential of the first communication line by the constant voltage, the fourth target potential being lower than the potential of the second communication line by the constant voltage, wherein:

when the driving portion drives the first cathode-side element part and the second anode-side element part, the driving portion generates the differential voltage between the first communication line and the second communication line based on the constant voltage by at least one of inputting the second target potential to a control terminal of the first cathode-side element part and inputting the third target potential to a control terminal of the second anode-side element part;

when the driving portion drives the second cathode-side element part and the first anode-side element part, the driving portion generates the differential voltage between the first communication line and the second communication line based on the constant voltage by at least one of inputting the first target potential to a control terminal of the second cathode-side element part and inputting the fourth target potential to a control terminal of the first anode-side element part; and the differential voltage generated when the driving portion drives the first cathode-side element part and the second anode-side element part and the differential voltage generated when the driving portion drives the second cathode-side element part and the first anode-side element part have different polarities.

2. The transmission device according to claim 1, wherein:
each of the first cathode-side element part, the second cathode-side element part, the first anode-side element part, and the second anode-side element part includes one of a source follower circuit and an emitter follower circuit;

the source follower circuit includes a field effect transistor whose source is coupled with corresponding one of the first communication line and the second communication line; and the emitter follower circuit includes a bipolar transistor whose emitter is coupled with corresponding one of the first communication line and the second communication line.

3. The transmission device according to claim 1, wherein the target potential generating portion includes:
a constant current circuit coupled between the cathode-side power supply line and the anode-side power supply line;
a current mirror circuit;
a first current channel and a second current channel coupled with the constant current circuit through the current mirror circuit;
a first pair of diodes disposed on the first current channel and coupled with each other through a first junction point; and
a second pair of diodes disposed on the second current channel and coupled with each other through a second junction point,
wherein the first communication line is coupled to the first junction point and the second communication line is coupled to the second junction point so that each of the target potentials generated with reference to one of the potential of the first communication line and the second communication line is generated on an opposite side of corresponding one of the diodes from the one of the first communication line and the second communication line.

4. The transmission device according to claim 1, further comprising:
a first upper-limit control portion coupled in parallel with the first cathode-side element part, the first upper-limit control portion controlling the potential of the first communication line to be lower than or equal to an upper limit potential that is determined based on a potential of the cathode-side power supply line;
a second upper limit control portion coupled in parallel with the second cathode-side element part, the second upper-limit control portion controlling the potential of the second communication line to be lower than or equal to an upper limit potential that is determined based on the potential of the cathode-side power supply line;
a first lower-limit control portion coupled in parallel with the first anode-side element part, the first lower-limit control portion controlling the potential of the first communication line to be higher than or equal to a lower limit potential that is determined based on a potential of the anode-side power supply line; and
a second lower-limit control portion coupled in parallel with the second anode-side element part, the second lower-limit control portion controlling the potential of the second communication line to be higher than or equal to a lower limit potential that is determined based on the potential of the anode-side power supply line.

* * * * *